June 30, 1942. R. R. ROOT 2,287,906
INCUBATION OF EGGS
Filed Jan. 17, 1940 2 Sheets-Sheet 1
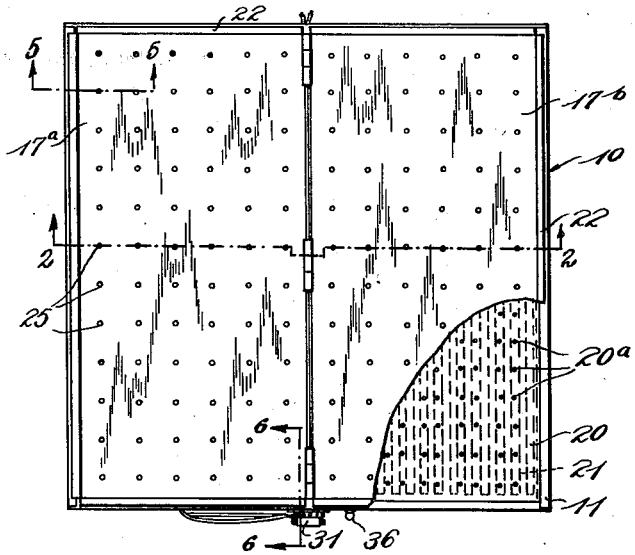
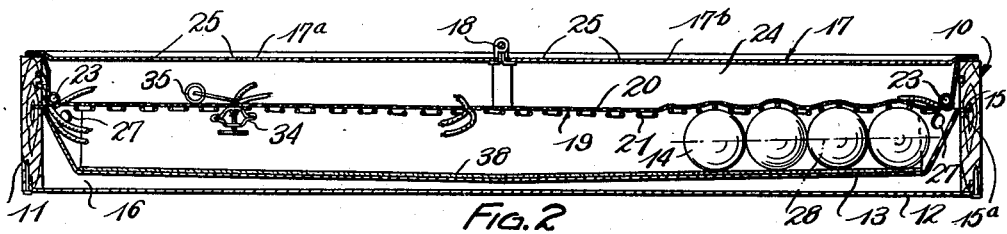
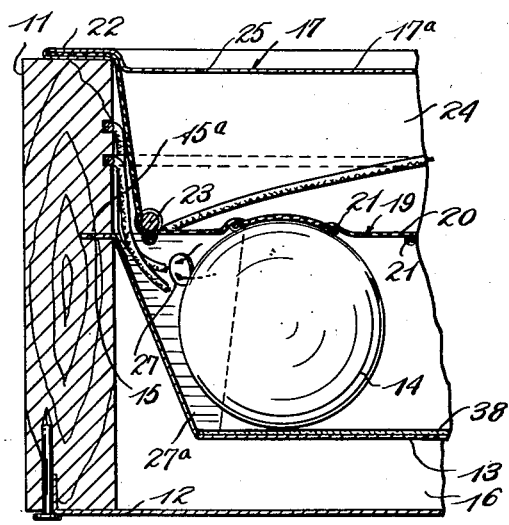
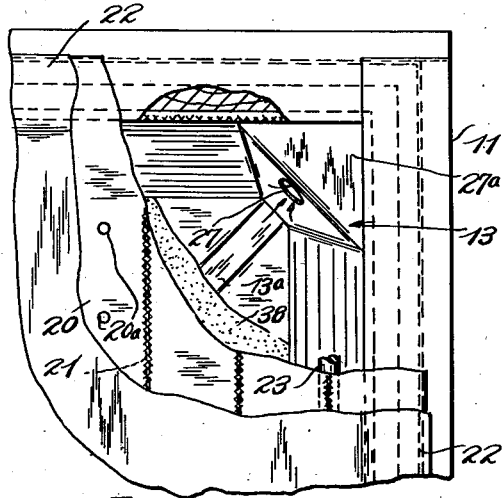
INVENTOR.
RALPH R. ROOT
BY Kwis Hudson & Kent
ATTORNEYS June 30, 1942.  R. R. ROOT  2,287,906
INCUBATION OF EGGS
Filed Jan. 17, 1940   2 Sheets-Sheet 2
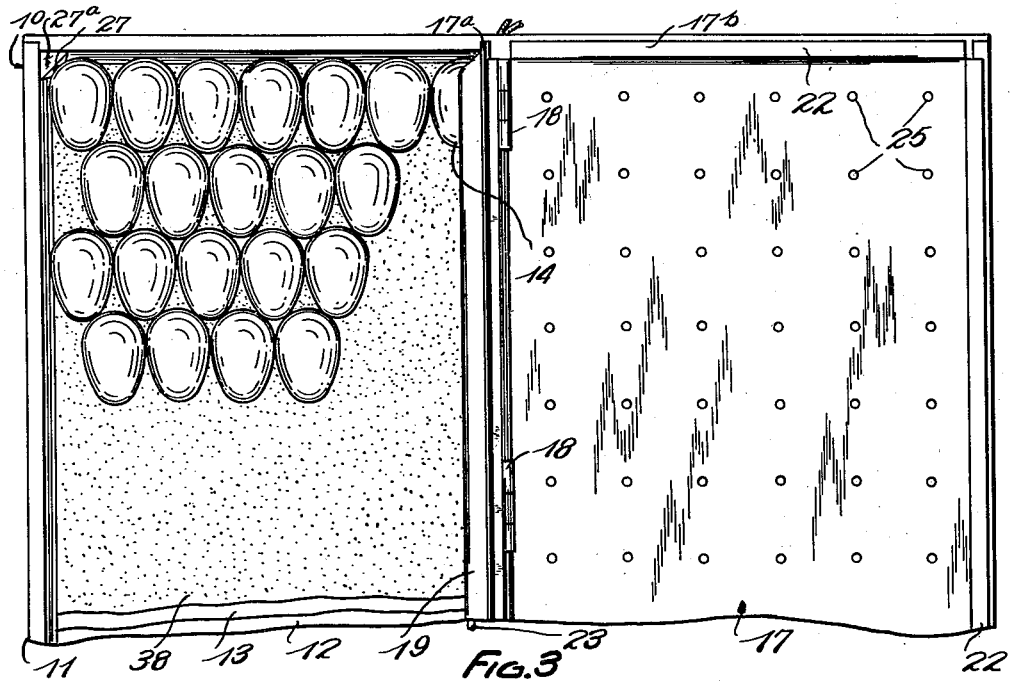
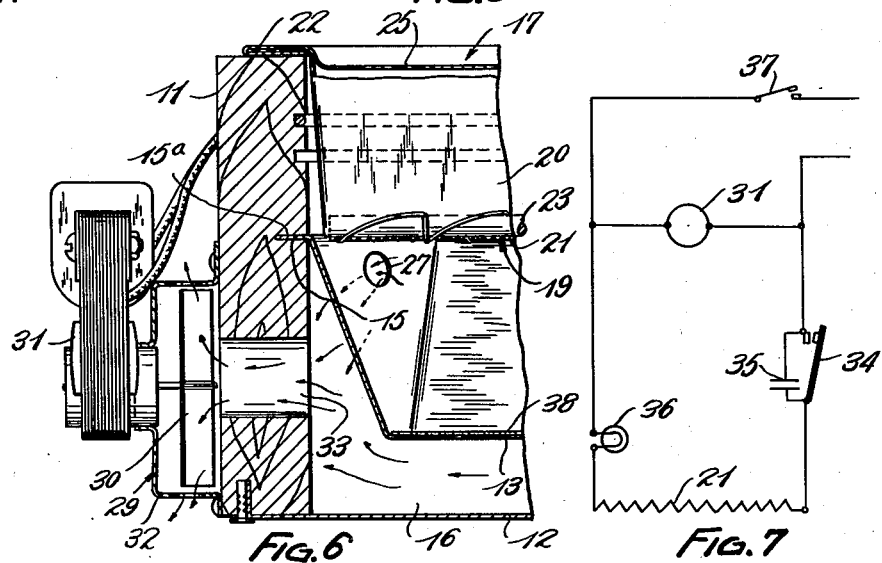
INVENTOR.
RALPH. R. ROOT
BY Kwis Hudson & Kent
ATTORNEYS Patented June 30, 1942

2,287,906

UNITED STATES PATENT OFFICE 2,287,906

INCUBATION OF EGGS

Ralph R. Root, Lakewood, Ohio

Application January 17, 1940, Serial No. 314,279

10 Claims. (Cl. 119—36)

This invention has to do with the incubation of eggs and aims to provide an improved method and simplified apparatus by which eggs can be incubated under conditions more nearly approaching those which exist during the incubation of eggs as carried out by a setting hen and by which a larger percentage of chicks and chicks of higher vitality will be obtained from the eggs.

An object of my invention is to provide an improved method and apparatus for incubating eggs in which heat is supplied to the eggs by a heating means placed in contact therewith and fresh air is supplied to the eggs at a temperature lower than that of the eggs themselves.

Another object of my invention is to provide an improved method and apparatus for incubating eggs in which the contact heating of the eggs is carried out by supplying heat to the upper portions of the eggs and the supply of fresh air is caused to flow over the upper portions of the eggs substantially without causing a forced movement of the air surrounding the lower portions of the eggs.

A further object of my invention is to provide an improved method and apparatus for incubating eggs in which heat and fresh air are supplied to the eggs from thereabove in a manner such that the moisture content of the eggs is conserved and the need for additional humidification is avoided.

Still another object of my invention is to provide improved incubating apparatus having novel means for supplying contact heat and diffused fresh air to the upper portions of the eggs being incubated.

A further object of my invention is to provide improved incubating apparatus in which an airpervious sheet is arranged to extend over the tops of the eggs to be incubated and has a thermostatically controlled electric heating means thereon for supplying contact heat to the eggs and in which means is provided for supplying fresh air to the eggs through said sheet and causing such fresh air to flow over the upper portions of the eggs.

My invention may be further briefly summarized as consisting in certain novel steps of procedure, combinations and arrangements hereinafter described and particularly set out in the appended claims.

In the accompanying sheets of drawings:

Fig. 1 is a plan view, with parts broken away, showing an incubating device constructed according to my invention;

Fig. 2 is a transverse sectional view taken through the device, as indicated by line 2—2 of Fig. 1, but on a larger scale;

Fig. 3 is a partial plan view of the incubating device showing a cover section thereof swung upward to an open position;

Fig. 4 is a plan view of one corner of the device showing the same on a larger scale and with portions broken away;

Fig. 5 is a sectional view taken through a side of the device, on line 5—5 of Fig. 1, and illustrating the construction on a somewhat larger scale;

Fig. 6 is a similar sectional view taken through a side of the device, as indicated by line 6—6 of Fig. 1, and showing the arrangement of the air flow creating means; and Fig. 7 is a wiring diagram.

Further reference will now be made to the drawings for the purpose of describing my improved method and apparatus for incubating eggs, and although my method and the illustrated embodiment of my apparatus are described in considerable detail and with reference to the hatching of baby chicks, it will be understood, of course, that my invention may involve other steps of procedure and forms of apparatus than those herein described and can also be applied to the hatching of the eggs of various kinds of fowls.

According to my improved method of incubating eggs, I arrange a group of eggs in a single layer in a tray or the like and supply heat to the upper portions of the eggs and, at the same time, cause a supply of fresh air to flow over the upper portions of the eggs substantially without causing a forced circulation or movement of the air surrounding the lower portions of the eggs. The fresh air thus supplied is not preheated, but is preferably of a temperature slightly lower than that of the eggs themselves. I find that in thus supplying contact heat and fresh air to the upper portions only of the eggs, the air surrounding the lower portions of the eggs may remain in a desired relatively cooler condition particularly during the early stages of incubation. However, as incubation of the eggs progresses and a circulation of blood occurs in the embryo chick the temperatures of the upper and lower portions of the eggs become more nearly equalized and the air surrounding the lower portions of the eggs will be more or less heated by contact with the eggs and will rise and be replaced by cooler air. Thus as the incubation of the eggs progresses, an adequate supply of fresh air to the lower portions of the eggs will also be assured. In my method I avoid the use of a blast of hot air and thereby eliminate the need for the humidifying means usually required therewith because the warming of the upper portions of the eggs by contact heating and the maintaining of the lower portions of the eggs relatively cooler conserves the moisture content of the eggs which is a factor very important to the successful incubation of eggs. My method can be carried out with apparatus which is much simplified as compared with present commercial forms of incubators and moreover I find that the conditions existing during my incubating method more nearly approach the natural conditions which exist when eggs are incubated under a broody hen and a high percentage of baby chicks of good vitality are obtained from the eggs.

In the drawings I show improved incubating apparatus which can be used for carrying out my method although the method can be practiced with other kinds of equipment. This apparatus may comprise a tray-like structure 10 which may be one of a number of similar units adapted to be arranged in a tier in a suitable rack or support. The unit 10 may comprise a relatively shallow quadrangular hollow frame or box 11 having an air tight bottom 12 and a shallow pan or tray 13 supported therein and adapted to contain a group of eggs 14 arranged as a single layer. The frame 11 may be formed of wood or other suitable material and the bottom 12 thereof is preferably formed of sheet metal. The pan 13 may also be formed of sheet metal and may have an outturned flange or rim 15 which is adapted to engage in a groove 15a of the frame 11 for supporting the pan therein in spaced relation above the bottom 12 so as to provide an air space or chamber 16 between. The bottom of the pan 13 may be slightly dished, as by having diagonal ribs 13a pressed or otherwise formed therein, so that the eggs will tend to remain in the center of the pan during handling of the unit.

The unit 10 may also include a cover 17 formed of sheet metal or other suitable material and of a size to extend over and close the top of the frame 11. This cover may comprise a single section or member of a size to fit the frame 11, but preferably and as shown in this instance, comprises two sections 17a and 17b which are connected by hinges 18 so that either section can be lifted or swung upwardly to expose a corresponding area or portion of the pan 13. The cover 17 is preferably not attached to the frame 11, but simply rests thereon and is removable therefrom to expose the entire area of the pan 13 when this is desirable.

For supplying heat to the eggs 14 I provide a contact heating means 19 in the form of a sheet or panel 20 carrying an electric heating means 21 and adapted to extend over and contact the tops of the eggs contained in the pan 13. The sheet 20 is preferably, but not necessarily, flexible in character and may be formed of any suitable material such as the cloth or fabric sheet shown in this instance. For a purpose to be presently explained, this sheet or panel is airpervious by reason of its inherent porosity or the numerous small openings 20a therein, or both. The electric heating means 21 is preferably in the form of a resistance heating element distributed over the sheet 20 and may comprise a resistance wire stitched, or otherwise attached, to the sheet and arranged thereon in numerous loops or parallel strands, as shown in Fig. 1.

The heating means 19 is preferably connected with the cover 17 and is arranged on the underside thereof so that when the cover is in closed position on the frame 11, the heating means will extend over and contact the tops of the eggs 14 and when the sheet 20 is flexible it will accommodate itself to, and more or less hug, the curvature of the upper portions of the eggs. The sheet 20 is of such size or area relative to the area of the cover 17 that it can hang therefrom with sufficient slack or looseness to enable the same to rest lightly on the tops of the eggs. The heating means 19 may be connected around its edges with the cover 17, as by crimping of the cover edges around the edges of the sheet as indicated in Fig. 5, thereby providing a rim portion 22 for the cover as well as a connection between the heating means and cover. To insure good contact between the heating means 19 and the tops of the eggs 14, I may provide weights along two or more edges of the heating means such as the metal bars 23 which are connected or stitched to the sheet 20 at these points and cause the same to hang or extend downwardly from the cover 17 into the frame 11. With the arrangement just described, it will also be seen that the main portion of the heating means 19 is spaced from the cover 17 so as to provide therebetween an air space or chamber 24 to which further reference will presently be made.

As is well known in the incubating art, fresh air must be supplied to the eggs during the incubating period to insure a supply of oxygen to the embryo chicks. For this purpose I cause a supply of fresh air to enter the space or chamber 24 between the cover 17 and the heating means 19 and to be supplied directly from this space to the upper portions of the eggs 14 by passing through the sheet or panel 20. The fresh air may be admitted to the chamber 24 through openings such as the holes 25 which may be distributed over the sections of the cover 17 and may be of suitable size to make a supply of relatively cool fresh air available over the entire area of the sheet 20. The chamber 24 serves as an air supply chamber and the sheet 20 serves as a diffusing means through which the relatively cool fresh air passes, without extensive preheating, in numerous streams distributed over an area corresponding with the area of the top of the pan 13 and is thus supplied directly to the upper portions of the eggs.

For reasons already mentioned, I find it desirable to have the fresh air flow over the upper portions of the eggs 14 without causing any substantial forced movement or circulation of the air surrounding the lower portions of the eggs and in accomplishing this I provide the sides of the pan 13, or preferably the corners thereof as shown in this instance, with air escape openings 27 of suitable size and number and which are located at or above a transverse plane extending through the centers of the eggs as represented by the broken line 28. By locating the escape openings 27 above this transverse mid-plane it will be seen that the fresh air entering the pan through the sheet or panel 20 and flowing to the escape openings 27 will readily tend to flow over the tops or upper portions of the eggs without causing a forced movement or disturbance of air surrounding the lower portions of the eggs. As shown in the drawings the escape openings 27 are offset from the inlet holes 25 and communicate with or lead into the air chamber 16 below the pan 13. When the openings 27 are located at the corners, the pan may have hollow box-like inserts 27a therein for establishing communication with the chamber 16.

The desired flow of fresh air in through the cover openings 25, through the sheet 20 and across the tops of the eggs, and the discharge of stale air through the escape openings 27 and the chamber 16 may be produced in any desired manner or by any appropriate air flow creating means. In this instance I show an air exhausting device 29 being used for this purpose and comprising a fan 30 driven by an electric motor 31. The fan 30 operates in a housing 32 which communicates with the chamber 16 through the passage 33 and draws the stale air from the chamber 16 and discharges the same to atmosphere thereby causing the desired inflow of cool fresh air through the holes 25 and the sheet 20.

Suitable electric connections may be provided for supplying current to the motor 31 and the heating element 21 and the supply of current to the latter may be controlled automatically for controlling the supply of heat to the eggs 14. In effecting the desired automatic control of the heat supply, I may provide a suitable thermostat 34 in series with the heating element 21 as indicated in Fig. 7. This thermostat is preferably located at a point adjacent the tops of the eggs 14 so as to be responsive to the temperature in the corresponding part of the pan 13. For supporting the thermostat in the desired location adjacent the tops of the eggs, as just mentioned, I may mount the thermostat on the sheet 20 of the heating means 19 as shown in Fig. 2. This thermostat may be of any suitable construction and may embody a condenser 35 as is usual in these devices. If desired, a small signal lamp 36 may be mounted on the outside of the frame 11, as shown in Fig. 1, and be connected in series with the heating element 21 so as to provide a visible signal for indicating when the heating element is being energized by electric current.

In the use of my improved method and incubating apparatus, a single layer of eggs 14 is placed in the pan 13 and the cover 17 is laid in closed position on the frame 11 so that the heating means 19 extends over and rests lightly on the tops of the eggs. A switch 37 is then closed to start the exhaust fan 29 to thereby produce the desired flow of fresh air into the device and across the tops of the eggs and which is maintained throughout the incubation period and thereafter until the baby chicks have all been removed from the pan 13. The thermostat 34 will operate to intermittently energize the heating element 21 to maintain the temperature at the upper portions of the eggs at the desired or predetermined value. If desired, a sheet 38 of paper or other suitable material may be placed in the pan 13 to prevent direct contact of the eggs with the metallic bottom thereof. After the eggs have hatched and the chicks have been removed from the pan this sheet with the litter thereon can be quickly removed from the pan.

From the foregoing description and the accompanying drawings, it will now be readily understood that I have provided an improved method and apparatus for the incubation of eggs under conditions more closely approaching those which exist when eggs are hatched by a hen and which result in a high percentage of chicks of high vitality being obtained from the eggs. It will also be seen that in the use of my method and apparatus the heat supplied to the eggs is a contact heat which warms the upper portions of the eggs and that the relatively cool fresh air is supplied to the eggs from above and flows over the upper portions thereof, whereby the air surrounding the lower portions of the eggs can be maintained relatively cooler for conserving the moisture content of the eggs. It will likewise be seen that my improved apparatus is of simple and economical construction and is capable of maintaining the newly hatched chicks in a comfortable and healthful state until it is desirable to remove them from the device. Moreover, it will be understood that although in describing my method and apparatus I have referred to chicks and the hatching of eggs by a hen, it will be understood, of course, that my method and apparatus can be applied with equal success to the hatching of the eggs of all kinds of fowls.

While I have illustrated and described my method and apparatus for incubating eggs in a more or less detailed manner, it will be understood, of course, that I do not wish to be limited to the precise steps of procedure and construction of apparatus herein disclosed but regard my invention as including such changes and modifications as do not constitute a departure from the spirit of the invention and the scope of the appended claims.

Having thus described my invention, I claim:

1. In an incubator, a tray having a substantially air-tight bottom and adapted to contain a plurality of eggs, an air-pervious sheet extending over and adapted to contact the tops of the eggs and provided with an electric heating means, and means for withdrawing air from within the tray at points below said sheet but above the general mid-plane of the eggs for causing a flow of air downwardly through said sheet and across the upper portions of the eggs substantially without causing a forced movement of the air surrounding the lower portions of the eggs.

2. In an incubator, a tray having a substantially air-tight bottom and adapted to contain a plurality of eggs, an air-pervious sheet extending across the tray and adapted to contact the tops of the eggs and having an electric heating element distributed thereover, and means for withdrawing air from the tray below said sheet for causing a flow of fresh air downwardly through said sheet to the eggs.

3. In an incubator, a tray having a substantially air-tight bottom and adapted to contain a plurality of eggs, a heating and air-diffusing means extending across the tray for supplying contact heat and fresh air to the eggs and comprising a flexible sheet having numerous air passages and an electric heating element thereon, means responsive to temperature conditions adjacent the eggs for thermostatically controlling the heat supply by said element, said tray having openings in the sides thereof below said flexible sheet, and an exhaust fan operable to withdraw air from the tray through said openings for causing a flow of air downwardly through said air-diffusing means to the eggs.

4. In incubating apparatus of the character described, a tray adapted to contain a plurality of eggs and having a substantially air-tight bottom supporting the eggs, a cover for the tray having on the underside thereof and connected therewith a heating means in the form of a flexible sheet provided with an electric heating element and adapted to contact the upper portions of the eggs when the cover is in closed position over the tray, there being an inlet for a flow of air into the tray above the eggs, and means for withdrawing air from the tray at a point above said airtight bottom but below said flexible sheet.

5. In incubating apparatus of the character described, a tray adapted to contain a plurality of eggs and having a substantially airtight bottom supporting the eggs, a cover for the tray having on the underside thereof and connected therewith a heating means in the form of a flexible sheet provided with an electric heating element and adapted to contact the upper portions of the eggs when the cover is in closed position over the tray, a thermostat controlling said heating element and located to be responsive to temperature conditions adjacent the upper portions of the eggs, there being an inlet for a flow of air into the tray above the eggs, and means for withdrawing air from the tray at a point above said air-tight bottom but below said flexible sheet.

6. In incubating apparatus of the character described, a frame, a pan supported in said frame and adapted to contain a plurality of eggs, a cover on the frame having on the underside thereof a flexible sheet adapted to contact the eggs when said cover is in closed position, an electric heating element carried by said sheet for supplying heat to the eggs, said cover having an air inlet opening therein and said pan having air escape openings in the sides thereof at an elevation above the mid-plane of the eggs, and means for causing a flow of air through said cover opening and flexible sheet and across the eggs to said escape openings.

7. An incubator for eggs comprising a shallow frame having a bottom, a pan adapted to contain a plurality of eggs and supported in the frame with an air chamber between the same and said bottom, said pan having openings in the sides thereof at an elevation above the general mid-plane of the eggs and leading into said chamber, a cover for the frame, an air-diffusing sheet connected around its edges with said cover with an air space therebetween and adapted to engage the tops of the eggs when the cover is in closed position, an electric heating element carried by said sheet, and means for withdrawing air from said chamber to thereby induce a flow of fresh air through said diffusing sheet and over the upper portions of the eggs.

8. In incubating apparatus of the character described, a tray adapted to contain a plurality of eggs, a cover for the tray having connected therewith and spaced from the underside thereof a heating means in the form of a flexible sheet provided with an electric heating element and adapted to contact the upper portions of the eggs when the cover is in closed position on the tray, a thermostat controlling said electric heating element, said flexible sheet being air-pervious and said cover having an air inlet opening leading to the space between said sheet and cover, and means for withdrawing air from the tray below the sheet to thereby induce a flow of fresh air through said cover opening and sheet to the eggs.

9. The method of incubating eggs which comprises applying a heated solid to the tops of a group of eggs, forcing a current of air cooler than the eggs downward into contact with the upper surfaces of the eggs and then substantially horizontally away from the eggs, and maintaining the air in contact with the lower surfaces of the eggs substantially free from currents.

10. The method of incubating eggs which comprises arranging eggs in a group, applying a heated air-pervious solid to the tops of the eggs, withdrawing air from the egg group at a point below said solid but above the mid-plane of the eggs, admitting and diffusing fresh air through said solid and over the upper surfaces of said eggs, and maintaining the air in contact with the lower surfaces of the eggs substantially free from currents.

RALPH R. ROOT.